United States Patent
Patel et al.

(10) Patent No.: US 7,845,187 B2
(45) Date of Patent: Dec. 7, 2010

(54) THERMAL MANAGEMENT SYSTEM AND METHOD FOR AUTOMOTIVE VEHICLE

(75) Inventors: Upendra J. Patel, Canton, MI (US); William Schwartz, Pleasant Ridge, MI (US)

(73) Assignee: Ford Global Technologies, Dearborn, MI (US)

( * ) Notice: Subject to any disclaimer, the term of this patent is extended or adjusted under 35 U.S.C. 154(b) by 1176 days.

(21) Appl. No.: 11/308,382

(22) Filed: Mar. 20, 2006

(65) Prior Publication Data
US 2007/0214819 A1 Sep. 20, 2007

(51) Int. Cl.
*F25D 23/12* (2006.01)
*B60H 1/32* (2006.01)
*B60K 11/00* (2006.01)
(52) U.S. Cl. .................. 62/259.2; 62/244; 180/68.2
(58) Field of Classification Search ........... 62/239, 62/228.4, 259.2, 244; 180/68.1, 68.2, 68.4
See application file for complete search history.

(56) References Cited
U.S. PATENT DOCUMENTS

| | | | |
|---|---|---|---|
| 5,609,037 A * | 3/1997 | Fischler | 62/239 |
| 5,983,658 A | 11/1999 | Kelm et al. | |
| 6,450,275 B1 * | 9/2002 | Gabriel et al. | 180/65.23 |
| 6,598,671 B1 | 7/2003 | Zeng et al. | |
| 6,651,761 B1 * | 11/2003 | Hrovat et al. | 429/13 |
| 6,675,592 B2 | 1/2004 | Huang et al. | |
| 6,675,873 B2 | 1/2004 | Ieda et al. | |
| 6,755,032 B1 | 6/2004 | Kotwicki et al. | |
| 6,978,628 B2 * | 12/2005 | Honda | 62/134 |
| 7,310,961 B2 * | 12/2007 | Hoshi et al. | 62/244 |
| 2002/0073726 A1 * | 6/2002 | Hasebe et al. | 62/323.1 |
| 2004/0118142 A1 | 6/2004 | Hsu et al. | |
| 2004/0200610 A1 | 10/2004 | Hara | |
| 2005/0044873 A1 | 3/2005 | Tamai et al. | |
| 2005/0077367 A1 | 4/2005 | Lee | |

* cited by examiner

*Primary Examiner*—Chen-Wen Jiang
(74) *Attorney, Agent, or Firm*—Jerome R. Drouillard; David Kelley

(57) ABSTRACT

A thermal management system for an automotive vehicle includes air cooled heat exchangers for an HVAC system, for a prime mover, and for various electronics componentry. All heat exchangers are cooled by a common air stream flowing from the ambient. The amount of heat imparted to the air stream through the HVAC system is controlled as to permit optimal cooling of the vehicle electronics and vehicle prime mover.

16 Claims, 3 Drawing Sheets

US 7,845,187 B2

THERMAL MANAGEMENT SYSTEM AND METHOD FOR AUTOMOTIVE VEHICLE

BACKGROUND OF THE INVENTION

The present invention relates to an integrated system and method for managing heat rejection from not only a vehicle's prime mover and electronic componentry.

The management of heat rejection from various vehicular systems, subsystems, and components has been the subject of much engineering effort since the dawn of the automotive age. Following earlier attempts at direct air cooling of prime movers, air-to-liquid heat exchangers became the dominant mechanism for rejecting waste heat from powertrains, whether based on conventional internal combustion engine technology, or hybrid technology, or other types of powertrains. Air-to-liquid heat exchangers are the preferred means for rejecting waste heat from vehicular heating, ventilating, and air conditioning ("HVAC") systems, as well.

There are at least two drawbacks to conventional automotive air-to-liquid heat exchange systems. In general, vehicular air conditioning condensers are usually located within a stream of "new", or unheated, ambient air. Having flowed through the HVAC condenser, the cooling air then flows serially through additional heat exchangers, such as a prime mover heat exchanger and/or an electronics heat exchanger. While promoting efficient operation of the HVAC system, a disadvantage of this arrangement resides in the fact that the heated air flowing from the HVAC condenser has a reduced capacity to absorb heat, thereby limiting the system's ability to transfer heat from coolant flowing through the downstream heat exchangers. Moreover, although it may be acceptable to mount additional heat exchangers on the roof of a vehicle, such as is commonly done with commercial vehicles, the additional fact is that, with passenger vehicles, the ability to mount a heat exchanger so as to access a flow of ambient temperature air is circumscribed by the dictates of styling and packaging. The present system and method provide a means for achieving acceptable cooling with a single air stream flowing serially through a number of heat exchangers, by controlling the addition of heat to the air stream.

SUMMARY OF THE INVENTION

A thermal management system for an automotive vehicle includes an air-cooled HVAC heat exchanger and an electronics heat exchanger cooled by a common air stream flowing first through the HVAC heat exchanger. A prime mover heat exchanger is cooled by air flowing from the electronics heat exchanger. All of these heat exchangers are cooled by ambient air flowing from a single source originating in the ambient. A controller senses at least one vehicle operating parameter and controls the amount of heat rejected by the HVAC heat exchanger to the common airstream, based at least in part upon the sensed value of the operating parameter. According to the present invention, the HVAC heat exchanger may include a refrigeration condenser.

The present system is useful with prime movers including fuel cell, internal combustion engine, battery power packs, or hybrids having various combinations of these devices, such as an internal combustion engine and an electrodrive system including an electrical energy storage device.

According to another aspect of the present invention, a thermal management system may further include an HVAC cabin heating system having a flow-through heat exchanger for rejecting heat carried within a fluid flowing to at least one of an HVAC heat exchanger, a prime mover heat exchanger and an electronics heat exchanger, to the ambient. The flow-through heat exchanger is connected by means of an externally connected duct to the exterior of the vehicle.

According to another aspect of the present invention, a system controller may control the amount of heat rejected by a vehicular HVAC heat exchanger by controlling the operating speed of an air conditioning compressor incorporated within the HVAC system. This method and system are equally applicable to both electrodrive and mechanically driven HVAC compressors, with the latter having a clutch interposed between the compressor and a source of mechanical power, such as an engine crankshaft or camshaft.

According to another aspect of the present invention, a method for managing heat rejection to the ambient by a vehicle having an HVAC system and power electronics, as well as prime mover and electronics cooling, includes the steps of providing a separate HVAC heat exchanger for the HVAC system, as well as heat exchangers for the electronics devices and for a prime mover. The present method includes directing a cooling air flow serially through each of the heat exchangers, while operating at least one of the HVAC system, the power electronics and the prime mover so as to control the amount of heat rejected to the cooling air flow. The present method may further include the step of providing an HVAC cabin heat exchanger and an externally connected air duct for rejecting heat from the HVAC system directly to the ambient.

It is an advantage of a system and method according to the present invention that both electronic and mechanical hardware onboard a vehicle may be protected from heat-related failures, while preserving the vehicle's function.

It is a further advantage of a method and system according to the present invention that thermal rejection by a vehicle to the ambient may be managed, notwithstanding usage of a single cooling air inlet into the vehicle.

It is a further advantage of a system and method according to the present invention that heat exchangers and/or related vehicular cooling components such as motors and fans may be downsized because the maximum heat load imposed upon the heat exchangers is governed by a controller, as opposed to being an open-loop operation.

Other advantages, as well as features and objects of the present invention, will become apparent to the reader of this specification.

DETAILED DESCRIPTION OF THE PREFERRED EMBODIMENTS

Figure 1:
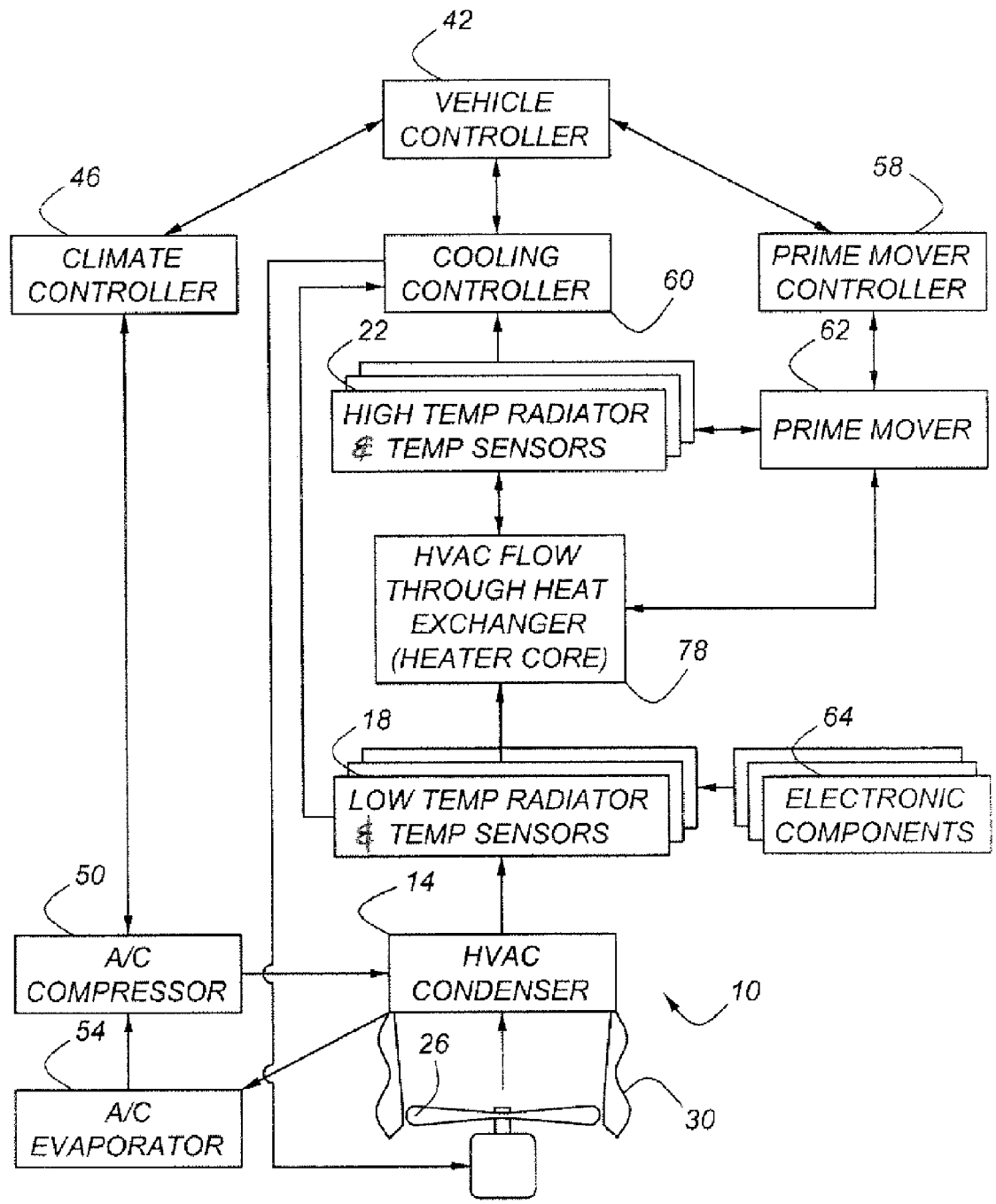
FIG. 1 is a block diagram of one embodiment of a thermal management system according to the present invention.

As shown in FIG. 1, a thermal management system, 10, for an automotive vehicle includes several air-cooled heat exchangers which are cooled serially by air forced by fan 26 through air intake duct 30. The first heat exchanger receiving outside air is HVAC exchanger 14. Air leaving heat exchanger 14 flows through low temperature radiator 18, which has temperature sensors associated therewith. Low temperature exchanger 18 is an electronics heat exchanger. Air having flowed through heat exchangers 14 and 18 then flows through heat exchanger 22, which is a high temperature radiator with temperature sensors. Heat exchanger, 22 is a prime mover heat exchanger for cooling an engine, a fuel cell, a battery pack, or other type of prime mover, including prime movers combining various ones of these elements.

HVAC condenser 14 receives compressed refrigerant vapor from AC compressor 50, which is equipped with associated temperature and pressure sensors (not shown). After the vapor has been changed to a liquid within condenser 14, the liquid refrigerant flows to AC evaporator 54. The operation of AC compressor 50 is controlled by climate controller 46, under commands from vehicle controller 42. Heat exchanger 18 receives coolant from various electronic components, 64. Finally, heat exchanger 22 receives heated coolant from prime mover 62. Prime mover 62 is controlled by prime mover controller 58, under commands from vehicle controller 42. Cooling controller 60 operates fan 26.

Referring once again to FIG. 1, air passing through HVAC condenser 14 is heated before moving serially to the electronics heat exchanger, low temperature radiator 18. The temperature of the flowing air builds again as air passes through the prime mover heat exchanger, high temperature radiator 22. Thus, in order to manage the amount of heat reaching heat exchangers 18 and 22, it is necessary to reduce the input of heat into the air flowing through HVAC condenser 14.

Figure 2:
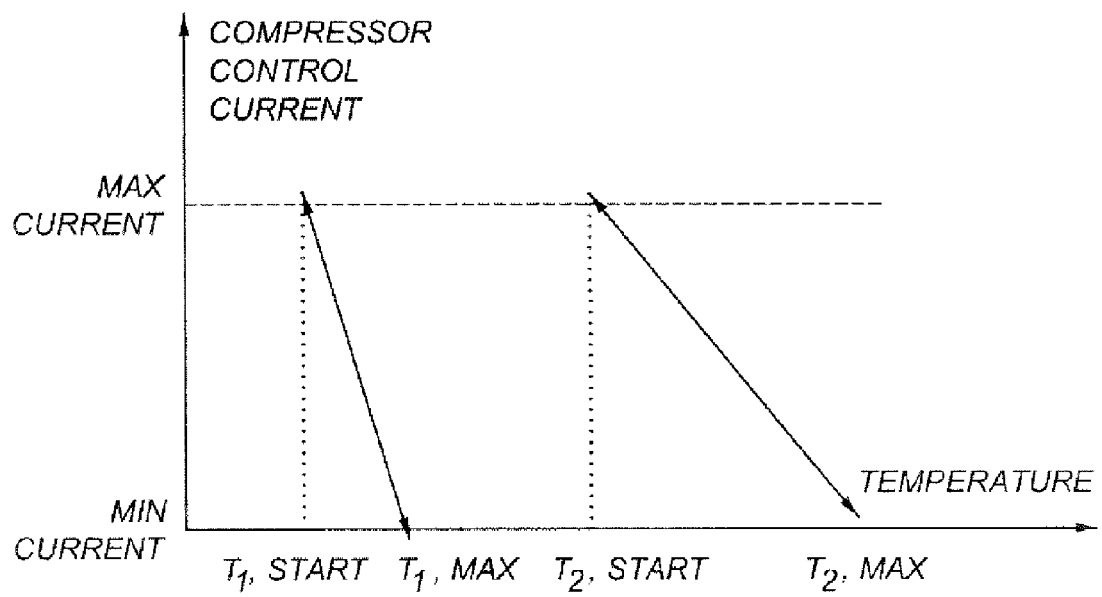
FIG. 2 is a plot showing an example of a temperature control method utilizing an electrodrive air conditioning compressor according to the present invention.

FIG. 2 illustrates a method for controlling the heat input into the cooling system through HVAC condenser 14. FIG. 2 is a plot showing compressor current for an electrodrive HVAC compressor as a function of two system operating temperatures. The control temperatures may, for example, be associated with some or all of: prime mover 62, electronic components 64, or other operating temperatures which, if uncontrolled, could result in component or system damage or inoperability.

Beginning in FIG. 2 with temperature T1, start, when a control temperature (such as an electronic component temperature) reaches T1 start, the drive, or control, current of HVAC compressor 50 is ramped down to a lower level. In this manner, with compressor 50 operating at a reduced speed, a lesser amount of heat will be rejected by HVAC condenser 14, thereby reducing the amount of heating of air flowing subsequently to heat exchangers 18 and 22. This will increase the amount of cooling available to the electronics componentry, as well as to the prime mover. If the control temperature continues to increase, the current will be ramped down further until a quasi steady state is reached. The ramp down illustrated is linear, but could alternatively be a polynomial function. If another control temperature (for example associated with the prime mover) reaches T2, start, then this will also result in the drive current of compressor 50 being limited. The logic in this example would be "or" conditional: the maximum compressor current would be limited by the smaller of the two control currents, based on the actual temperatures of the two components. If either T1, max, or T2, max has been reached additional thermal limiting actions may be taken. The management of heat rejection is particularly important with electric traction drive components such as power inverters. Regenerative braking also requires careful attention to the cooling needs of the prime mover system.

Figure 3:
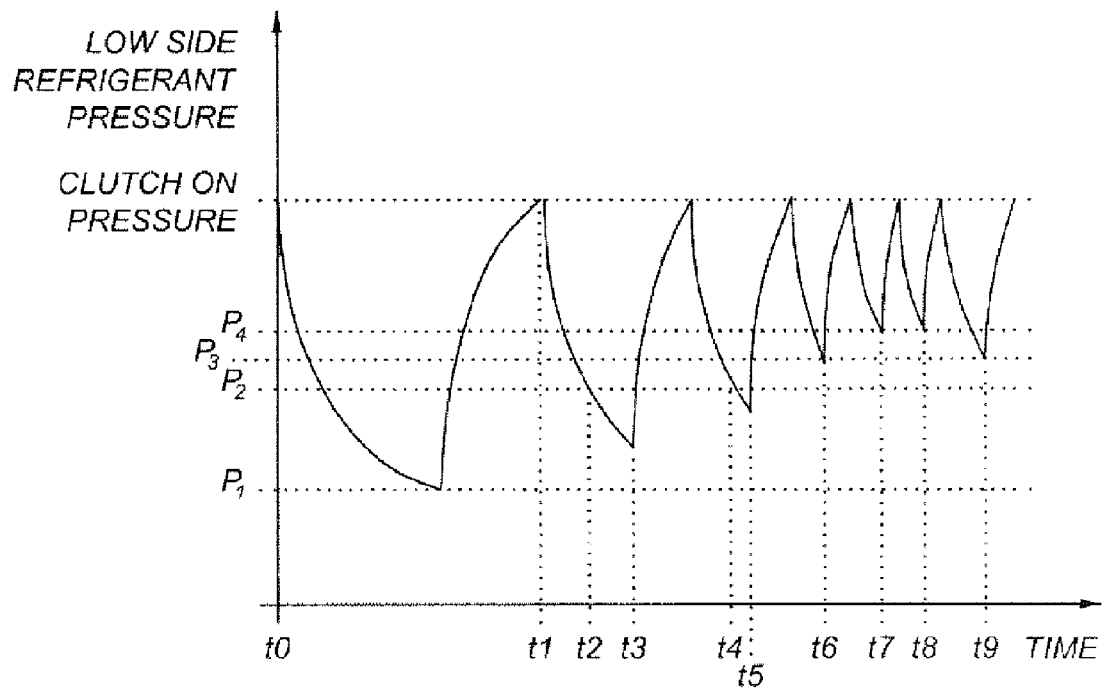
FIG. 3 illustrates operation of an air conditioning compressor according to one aspect of the present invention.

FIG. 3 illustrates, for a mechanically driven HVAC compressor, a control scheme in which compressor 50 is cycled off based on variable allowable durations for compressor clutch engaged time below a variable control pressure measured at the low pressure portion of the refrigerant loop. The variables of allowable duration and control pressure are changed as a function of the status of one or more control temperatures of the thermal management system. Should the pressure ever reach P1 in this scheme, the clutch is disengaged to prevent the formation of ice on the evaporator. P5 is the pressure at which the clutch is engaged. If a control temperature of the thermal management system increases to an extent requiring a compromise with air conditioning performance, then the clutch control pressure P1 is raised to P2. On the subsequent clutch cycle, the clutch is allowed to stay engaged for a certain time equal to T3 minus T2. Should the control temperature still not be reduced sufficiently, then, on the subsequent clutch cycle, the time duration is reduced to a revised time equal to T5 minus T4, which in this example approaches zero. Should the control temperature still not be reduced sufficiently, then on the subsequent clutch cycle the control pressure is raised to P3. Should the control temperature still not be reduced sufficiently, then on the subsequent clutch cycle the control pressure is raised to P4. Should the control temperature eventually be reduced sufficiently, then the control pressure is reduced back to P3. In other words, operation of compressor 50 will be limited as component temperature increases, so as to control heat rejected through HVAC condenser 14, so as to result in a balance between compressor run time for passenger cabin comfort and the impact of component temperature upon vehicle mobility.

Figure 4:
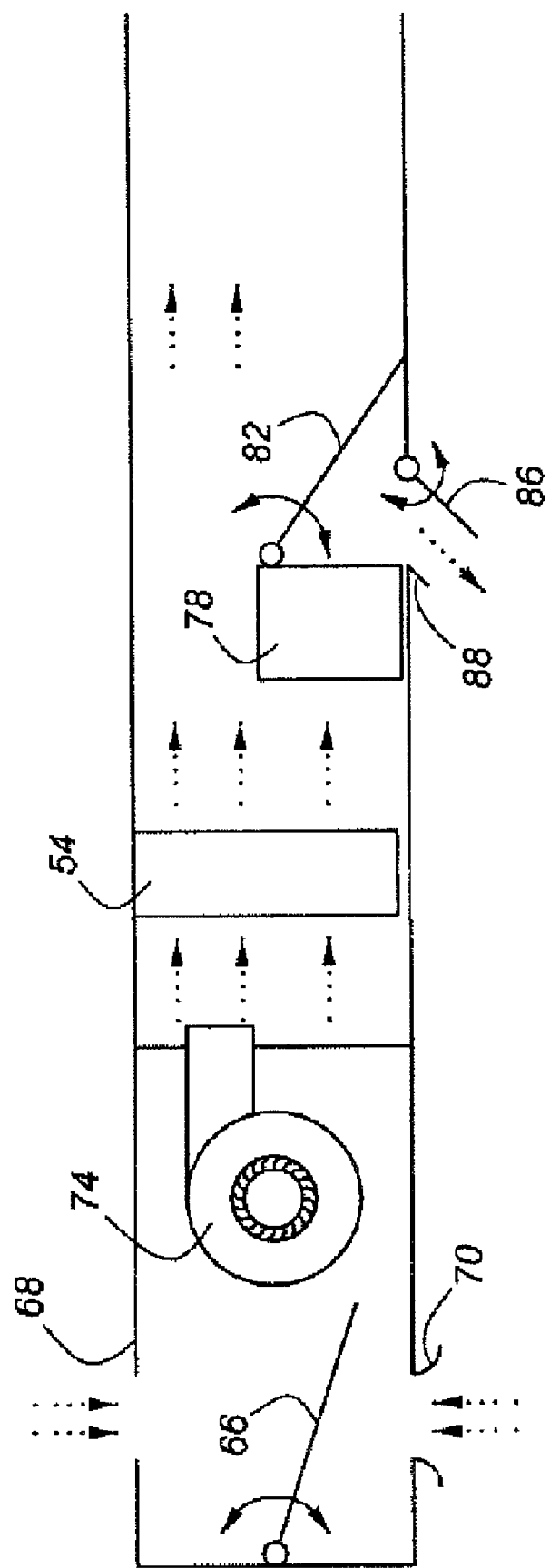
FIG. 4 illustrates an HVAC system air handling section according to one aspect of the present invention.

FIG. 4 illustrates a portion of an HVAC system according to the present invention in which cabin air passes variable recirculation door 66 and enters blower case 68. Outside air enters through outside air inlet 70. After passing through blower 74, the air flows through evaporator core 54, and then through heater core 78 (both of cores 54 and 78 are also shown in FIG. 1). Some of the air flowing through the HVAC system may be allowed by blend door 82 to pass into the passenger cabin, whereas some may be rejected through variable dump door 86 and externally connected duct 88 to the ambient. In this manner, heater core 78 functions as an integral cooling assist system for rejecting heat from the HVAC system directly to the ambient, so as to reduce the temperature of the coolant flowing, for example, to prime mover 62.

The present method and system offer a very versatile cooling system solution because, as noted above, prime mover 62 may be either a battery system, or a fuel cell system, or an internal combustion engine, or a hybrid including an internal combustion engine, batteries, and an electrodrive motor and transmission, or a fuel cell and associated electrodrive motor and transmission device. Such combinations of prime mover componentry are known to those skilled in the art; their selection is beyond the scope of the present invention.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A thermal management system for an automotive vehicle, comprising:
    an air-cooled HVAC heat exchanger;
    an electronics heat exchanger cooled by air flowing from said HVAC heat exchanger;
    a prime mover heat exchanger cooled by air flowing from said electronics heat exchanger; an HVAC cabin heating system comprising a flow-through heat exchanger for rejecting heat carried within a fluid flowing to at least one of said HVAC heat exchanger, said prime mover heat exchanger, and said electronics heat exchanger, to the ambient.

2. The thermal management system according to claim 1, further comprising a source of ambient air for cooling said HVAC heat exchanger, said electronics heat exchanger, and said prime mover heat exchanger.

3. The thermal management system according to claim 1, wherein said HVAC, heat exchanger; said electronics heat exchanger, and said prime mover heat exchanger are all cooled by a common air stream originating in the ambient.

4. The thermal management system according to claim 1, further comprising a controller for sensing at, least one operating parameter and for controlling the amount of heat rejected by said HVAC heat exchanger based at least in part upon the sensed value of said operating parameter.

5. The thermal management system according to claim 4, wherein said controller controls the amount of heat rejected by said HVAC heat exchanger by controlling the operating speed of an air conditioning compressor incorporated within an HVAC system installed in said vehicle.

6. The thermal management system according to claim 5, wherein said air conditioning compressor comprises an electrodrive compressor.

7. The thermal management system according to claim 5, wherein said air conditioning compressor comprises a mechanically driven compressor.

8. The thermal management system according to claim 1, wherein said HVAC heat exchanger comprises a refrigerant condenser.

9. The thermal management system according to claim 1, wherein said prime mover comprises a fuel cell.

10. The thermal management system according to claim 1, wherein said prime mover comprises an internal combustion engine.

11. The thermal management system according to claim 1, wherein said prime mover comprises a battery device.

12. The thermal management system according to claim 1, wherein said prime mover comprises a hybrid powerplant having both an internal combustion engine and an electrodrive system.

13. The thermal, management system according to claim 1, wherein heat is rejected to the ambient by means Of an externally connected duct extending from said flow-through heat exchanger to the exterior of the vehicle.

14. A method for managing heat rejection to the ambient by a vehicle having an HVAC system, power electronics, a prime mover, an electronics cooling system, and a prime mover cooling system, comprising the steps of:

providing a separate HVAC heat exchanger for said HVAC system, an electronics heat exchanger for said electronics cooling system, and a prime mover heat exchanger for said prime mover cooling system;

directing a cooling airflow through each of said heat exchangers;

operating at least one of said HVAC system, said power electronics, and said prime mover so as to control the amount of heat rejected to said cooling airflow; and providing an HVAC cabin heat exchanger and an externally connected air duct for rejecting heat from said HVAC system directly to the ambient.

15. The method according to claim 14, wherein a compressor associated with said HVAC system is operated so as to control the amount of heat rejected by said HVAC heat exchanger to said cooling airflow.

16. The method according to claim 14, wherein said cooling airflow is directed serially through each of said heat exchangers.

\* \* \* \* \*